United States Patent
Abke

(10) Patent No.: US 11,819,937 B2
(45) Date of Patent: Nov. 21, 2023

(54) ULTRASONIC PLUS RESISTANCE WELDING FOR AUTOMOTIVE APPLICATIONS

(71) Applicant: Honda Motor Co., Ltd., Tokyo (JP)

(72) Inventor: Timothy A. Abke, Dublin, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 465 days.

(21) Appl. No.: 17/000,891

(22) Filed: Aug. 24, 2020

(65) Prior Publication Data

US 2022/0055142 A1 Feb. 24, 2022

(51) Int. Cl.
 B23K 11/11 (2006.01)
 B23K 11/34 (2006.01)
 B23K 20/10 (2006.01)
 B23K 103/20 (2006.01)

(52) U.S. Cl.
 CPC ........... B23K 11/11 (2013.01); B23K 11/34 (2013.01); B23K 20/10 (2013.01); *B23K 2103/20* (2018.08)

(58) Field of Classification Search
 CPC ........... A61B 6/5235; A61K 51/0474; A61K 51/0482; A61K 51/0491; A61K 51/0495; B23K 11/11; B23K 11/115; B23K 11/20; B23K 11/34; B23K 20/10; B23K 2103/20; B23K 28/02; C07K 16/44
 USPC ........................................................ 219/91.2
 See application file for complete search history.

(56) References Cited

U.S. PATENT DOCUMENTS

| | | | |
|---|---|---|---|
| 6,291,792 B1 | 9/2001 | Fussnegger et al. | |
| 9,839,971 B2 | 12/2017 | Schroth et al. | |
| 10,058,949 B2 | 8/2018 | Carlson et al. | |
| 10,166,627 B2 | 1/2019 | Sigler et al. | |
| 10,232,461 B2 | 3/2019 | Riether | |
| 10,532,421 B2 | 1/2020 | Hahnlen et al. | |
| 2017/0297138 A1 | 10/2017 | Sigler et al. | |
| 2019/0061042 A1* | 2/2019 | Hahnlen | B23K 11/20 |
| 2019/0358733 A1 | 11/2019 | Sigler et al. | |

FOREIGN PATENT DOCUMENTS

| | | |
|---|---|---|
| JP | 4228211 | 2/2009 |
| JP | 5315207 | 10/2013 |
| KR | 20190101227 | 8/2019 |

* cited by examiner

Primary Examiner — Dana Ross
Assistant Examiner — Joseph W Iskra
(74) Attorney, Agent, or Firm — RANKIN, HILL & CLARK LLP

(57) ABSTRACT

A welded assembly includes a first component including an aluminum material, a second component including a stainless steel, and a third component including a steel material. An ultrasonic weld is formed between the first and second components to join them and form a stack. A sealant and/or adhesive may be applied to the stack. A resistance spot weld is used to join the third component to the stack to form the welded assembly. The resistance spot weld encompasses a portion of the first, second, and third components, and a portion of the ultrasonic weld. The resistance spot weld is completely encompassed in the welded assembly, and thus is sealed from electrolyte in a surrounding environment.

18 Claims, 3 Drawing Sheets

ULTRASONIC PLUS RESISTANCE WELDING FOR AUTOMOTIVE APPLICATIONS

BACKGROUND

Welding to bond dissimilar metals, e.g. aluminum and steel sheet metals, has been unsuccessful due to the inherent discrepancies in the metallurgical and physical properties between the two metals. The formation of the intermetallic compounds prohibits obtaining the satisfactory welds and promotes the corrosion. The issue of corrosion on joints between aluminum and steel is a concern for automotive applications.

Therefore, joining of dissimilar metals is typically accomplished through the use of adhesives or mechanical fasteners. However, mechanical fasteners require added weight, cost, parts, and assembly time. Adhesives require specialized equipment, increased takt time, and a separate thermal cycle to cure the adhesive to full strength. Changing to a different joining process often requires new infrastructure in factory assembly lines, costing additional capital investment, line re-design, and personnel training.

BRIEF DESCRIPTION

According to one aspect, a welded assembly includes a first component comprising an aluminum material; a second component comprising stainless steel, and welded to the first component by an ultrasonic weld; and a third component comprising a steel material, and welded to the first component with a resistance spot weld, the resistance spot weld encompassing at least a portion of the ultrasonic weld. The second component is arranged between the first component and the third component.

According to another aspect, a method of forming a welded assembly includes ultrasonic welding a second component comprising stainless steel to a first component comprising an aluminum material to form a stack; and resistance spot welding a third component comprising a steel material to the stack. The second component is arranged between the first component and the third component during resistance spot welding. A resistance spot weld formed during the resistance spot welding encompasses at least a portion of an ultrasonic weld formed during the ultrasonic welding.

DETAILED DESCRIPTION

Figure 1:
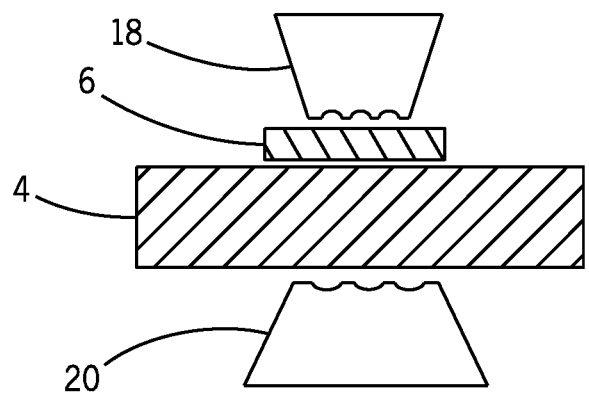
FIG. 1 is a schematic cross-section view of a step of ultrasonic welding a first component and a second component in accordance with the present subject matter
Figure 2:
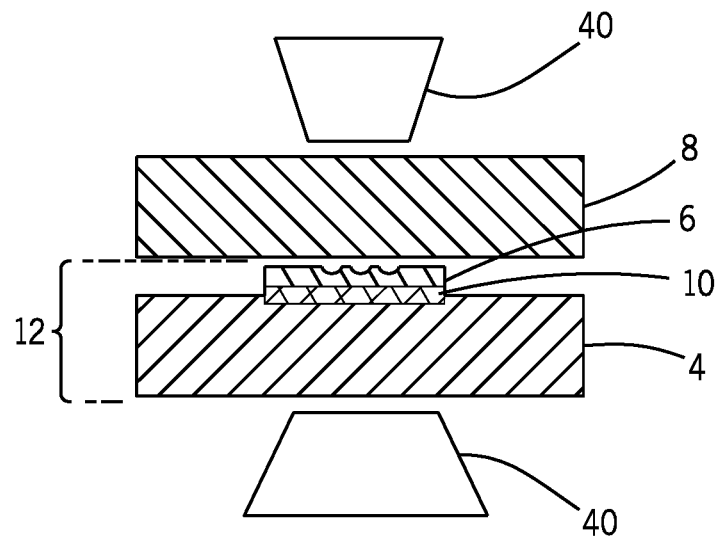
FIG. 2 is a schematic cross-section view of a step of resistance spot welding a third component to a stack in accordance with the present subject matter.

Welding between dissimilar metals/alloys, such as between aluminum alloys and steel, is an attractive topic in the automobile industry for developing multi-material structures, e.g. vehicle body structures, which may achieve strength requirements yet are lightweight.

With reference to the figures, a welded assembly 2 includes a first component 4, a second component 6, and a third component 8. The first component 4 is welded to the second component 6 via an ultrasonic weld 10 to form a stack 12. The third component 8 is welded to the stack 12 via a resistance spot weld 14. The second component 6 is arranged between the first component 4 and the third component and thus may separate the first component 4 and second component 8 at least in the area of the resistance spot weld 14.

The first component 4 comprises or consists of an aluminum material. The aluminum material may be pure aluminum, or an alloy of aluminum. Examples of the aluminum material suitable for use in the first component 4 include, but are not limited to, Aural-2 or Aural-5 available from Cosma International, of Aurora, Ontario. Aural-2 is a alloy of $AlSi_{10}Mg$. Aural-5 is an alloy of $AlSi_7Mg$. Other aluminum alloys can be used including those of $AlSi_9Cu_3$ and $AlSi_9Mn$. Aluminum Alloy 6022, 6111, and 6016 available from Alcoa can also be used. Other aluminum alloys can be used, including those having 75-95% aluminum, with a remainder of copper, magnesium, manganese, silicon, tin, zinc, or combinations thereof.

The first component 4 may be formed by any of a variety of processes, including forging, stamping, casting (e.g. die casting), rolling, extruding, etc. In a non-limiting embodiment, the first component 4 is formed by high pressure die casting.

The aluminum material of the first component 4 may be strengthened by tempering, e.g. by using a material having been subject to O, T4, or T6 tempering.

The second component 6 comprises or consists of stainless steel (SS). Examples of stainless steel suitable for use in the second component 6 includes, but are not limited to, grades in the 200 series, 300 series (including grades 301, 302, 303, 304, 316, 321), 400 series (including grades 408, 409, 410, 416, 420, 430, 439, 440), 500 series, and 600 series (including grade 630), precipitation hardened stainless steel, and duplex stainless steel. In a non-limiting embodiment, the stainless steel of the second component is a 316 grade stainless steel.

The second component 6 may be in the form of a foil or sheet, or alternatively a component with a relatively larger gauge. In a non-limiting embodiment, the second component is in the form of a foil having a gauge of 7-30 (i.e. a thickness of 0.255 mm-3.665 mm).

Stainless steel is used as the second component 6 because it provides a positive condition to inhibit galvanic corrosion. That is, stainless steel is compatible with the aluminum material of the first component 4 and a steel material of the third component 8. By "compatible," it is meant that the stainless steel does not experience/cause galvanic corrosion when in contact with the first and third components 4, 8 as part of the welded assembly 2, and/or that it causes less galvanic corrosion than compared to welding the first component 4 directly to the third component 8 without having the second component 6 arranged therebetween.

The second component 6 may act as a diffusion barrier, which thereby inhibits one or more of galvanic corrosion, the formation of IMCs, and solidification cracking in the resistance spot weld 14.

The second component 6 may be a single-layer or multi-layer structure. A multi-layer second component 6 may include multiple layers of various types/grades of stainless steel, and these may be joined together before resistance spot welding, such as by solid state welding techniques like ultrasonic spot welding (USW), UAM, or by roll bonding, diffusion welding, clad welding, or sputtering of the various layers.

The second component 6 may have a gradient or otherwise varying or changing composition as it goes from interfacing the first component 4 to interfacing the third component 8.

The third component comprises or consists of a steel material that has a different composition than the stainless steel of the second component. In a non-limiting embodiment, the steel material of the third component 8 is not stainless steel. The steel material may be a coated/treated steel.

Examples of steel material that are not stainless steel and are suitable for use in the third component 8 include, but are not limited to, grade JAC590 steel (which has a 0.8 mm thick Zn coating), hot formed steel such as Usibor 1500, and press hardened boron steel.

Figure 5:
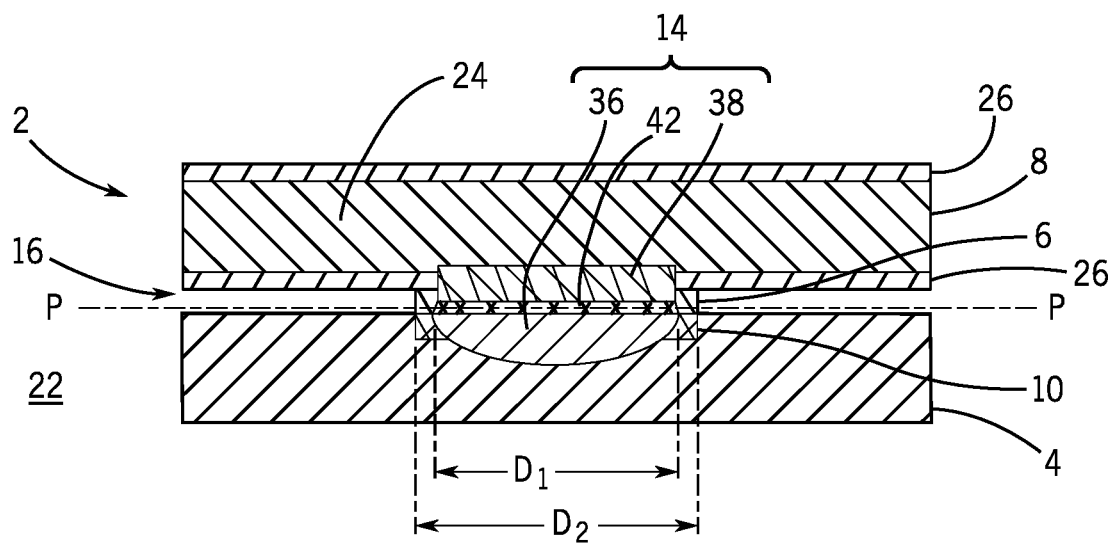
FIG. 5 is a schematic cross-section view of a welded assembly in accordance with the present subject matter.

As depicted in FIG. 5, the steel material 24 may include one or more coatings 26 on a surface of the steel material 24. The coating 26 may include, but not limited to, an aluminum-silicon coating, a hot dipped galvanized coating which provides a galvanized steel including a layer of zinc on the surface of the steel material 24, galvannealed coating which provides galvannealed steel including a layer of zinc on the surface of the steel material 24 that is then annealed with the underlying steel material, or a zinc-nickel alloy coating.

The ultrasonic weld 10 bonding the first component 4 to the second component 6 may be formed via Ultrasonic Spot Welding (USW) or Ultrasonic Additive Manufacturing (UAM), which can be used for ultrasonic welding of the second component 6 to the first component 4. USW and UAM are solid-state (i.e. no melting) metal welding processes based on ultrasonic metal welding. In the ultrasonic metal welding, an ultrasonic welder may be used, which includes a sonotrode (i.e. horn) 18 driven by one or more piezoelectric transducers to impart ultrasonic vibrations under a compressive force to the parts to be joined (i.e. first component 4 and second component 6), by arranging the parts to be joined between the sonotrode 18 and an anvil 20.

The sonotrode 18 operates at a vibration frequency typically about 20 kHz or 40 kHz (nominal) that is transverse to the metal part to create plastic deformation between the metal part and the material to which it is being welded. When two metal parts (i.e. first component 4 and second component 6) are being ultrasonically welded, vibrations imparted by the sonotrode 18 on the metal workpiece (i.e. either first component 4 or the second component 6), along with a static compressive force provided by pressing the sonotrode 18 toward the anvil 20, cause a metallurgical bond to form between the two metal parts (i.e. first component 4 and second component 6). Process temperatures are low, typically below 150° C., and thus inhibit the formation of brittle IMCs, inhibit altering the microstructure of the bulk of the joined metal materials, and inhibit heat-induced distortion or property degradation of the joined metal materials.

Ultrasonic welding is useful for joining the first component 4 and second component 6 because it is a low temperature process—meaning that it may not alter the effect of prior heat treatments or the microstructure of the first component 4 or the second component 6 on a meso- or macro-scale, and is able to join metal materials having dissimilar compositions without formation of adverse IMCs.

Second, USW and UAM are solid state processes that requires no other material to form the ultrasonic weld 10. The USW and UAM processes thus result in the absence of any contaminants that would be in the weld pool, such as if an adhesive or other substance is used to maintain the location of the second component 6 relative to the first component 4. Ultrasonic welding the second component 6 to first component 4 allows the second component 6 to be maintained at a desired location on the first component 4 during spot welding, by preventing movement of the second component 6 with respect to the first component 4. This allows the first component 4 and the second component 6 to be transported, for example, from one location (e.g. a supplier) to another location (e.g. a vehicle assembly line) while keeping the second component 6 at a desired location on the first component 4 for later resistance spot welding with the third component 8. The ultrasonic weld 10 is strong and durable, thus allowing the second component 6 to be welded to the first component 4 at a separate time and place from the act of joining the first component 4 to the third component 8.

Further, ultrasonic welding produces a continuous hermetic bond between the first component 4 and the second component 6, such that the interface between the bonded structures can be isolated from the exterior environment thereby avoiding corrosion or infiltration by contaminants such as an electrolyte. The resistance spot weld 14 may thus be sealed from coming into contact with an electrolyte from a surrounding environment 22, by being completely surrounded, and thus sealed from electrolyte in the surrounding environment 22, by a combination of the first component 4, the second component 6, the third component 8, and the ultrasonic weld 10.

Where the resistance spot weld 14 is entirely surrounded by the structure of the welded assembly 2, this hermetic bond from the ultrasonic weld 10 may contribute to inhibiting electrolyte in the surrounding environment 22 from coming into contact with the resistance spot weld 14. In a non-limiting embodiment, the resistance spot weld 14 is completely surrounded, by having a configuration such that in a plane P-P parallel to an interface 28 between the first component 4 and the second component 6, and where the plane P-P intersects the ultrasonic weld 10 and the resistance spot weld 14, a diameter $D_1$ (i.e. an area when considered in a third dimension extending into the drawing) of the resistance spot weld 14 is smaller than, and thus is completely encompassed in, a diameter $D_2$ (i.e. an area when considered in a third dimension extending into the drawing) of the ultrasonic weld 10. This configuration allows the resistance spot weld 14 to be sealed from electrolyte (e.g. water vapor or moisture) in the surrounding environment 22, and inhibits the electrolyte from entering into the welded region (i.e. the region including the ultrasonic weld 10 and the resistance spot weld 14) of the welded assembly 2 and causing galvanic reaction at the resistance spot weld 14 and between the steel material of the third component 8 and the aluminum material of the first component 4.

Figure 4:
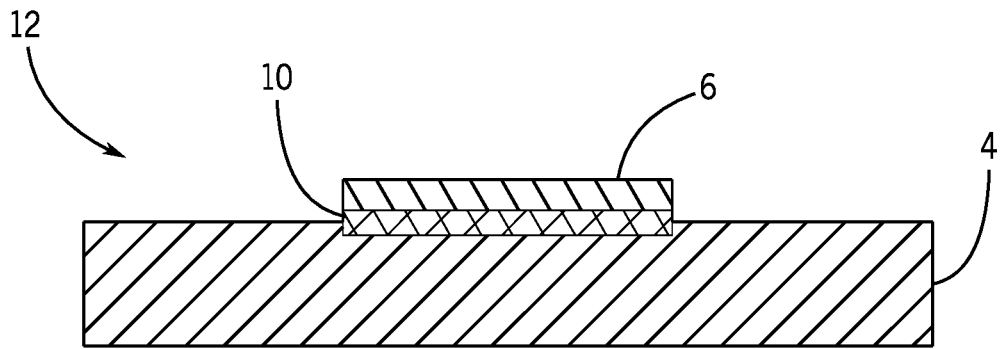
FIG. 4 is a schematic cross-section view of a stack in accordance with the present subject matter.
Figure 6:
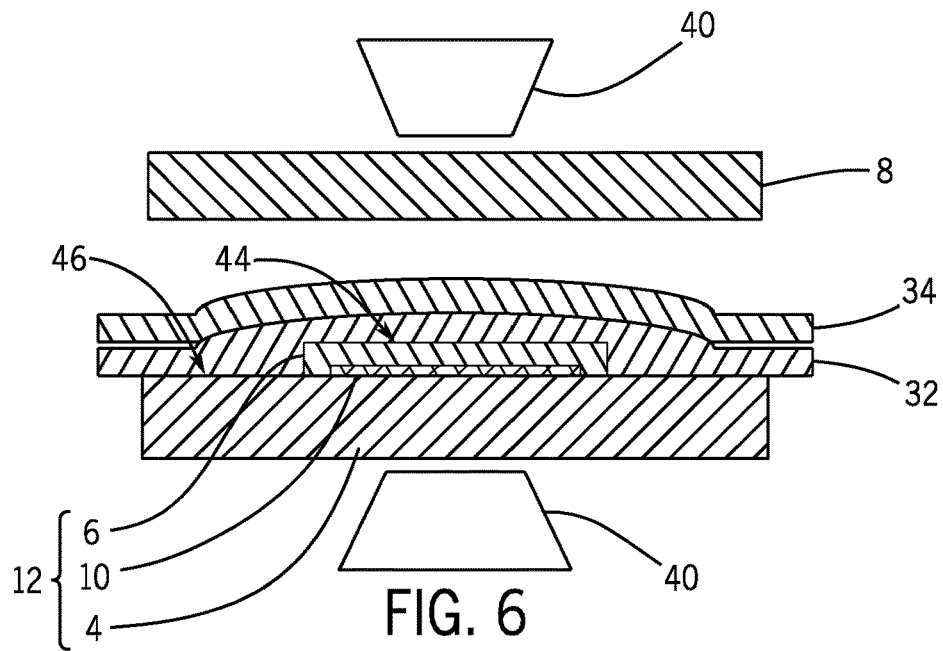
FIG. 6 is a schematic cross-section view of a step of resistance spot welding a third component to a stack in accordance with the present subject matter.
Figure 7:
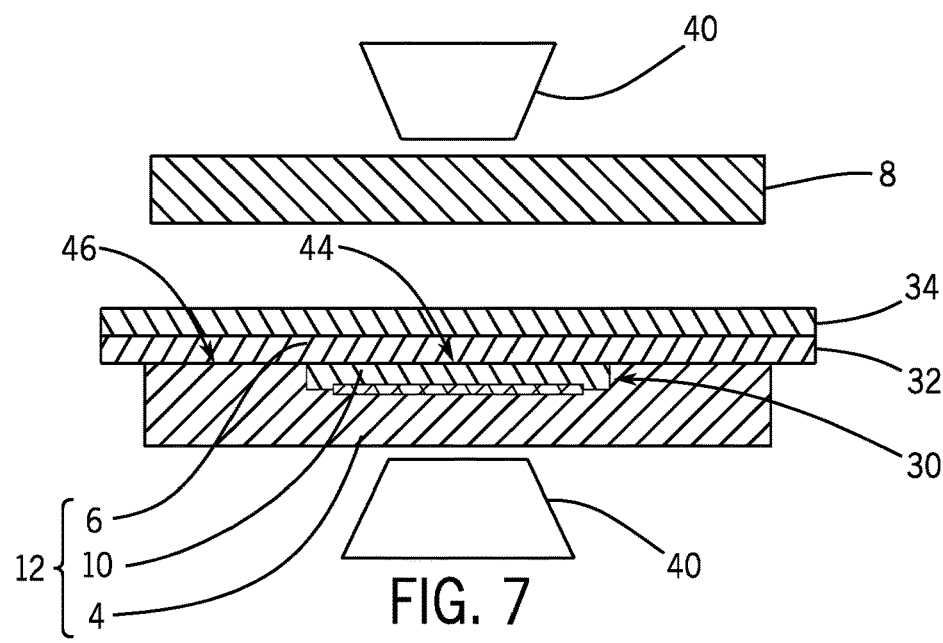
FIG. 7 is a schematic cross-section view of a step of resistance spot welding a third component to a stack in accordance with the present subject matter.

Before forming the ultrasonic weld 10, the second component 6 may be arranged in a depression 30 in the first component 4, such that a surface 44 of the second component 6 and a surface 46 of the first component 4 are flush with each other before forming the ultrasonic weld 10 (FIG. 7) as opposed to not being flush (FIGS. 4-6). The 44 surface of the second component 6 and the 46 surface of the first component 4 may also be made flush simply by the force exerted by the sonotrode 18 during ultrasonic welding, which force may push the second component 6 into the mass of the first component 4. This may result in a stack 12 as depicted in FIG. 7.

Figure 3:
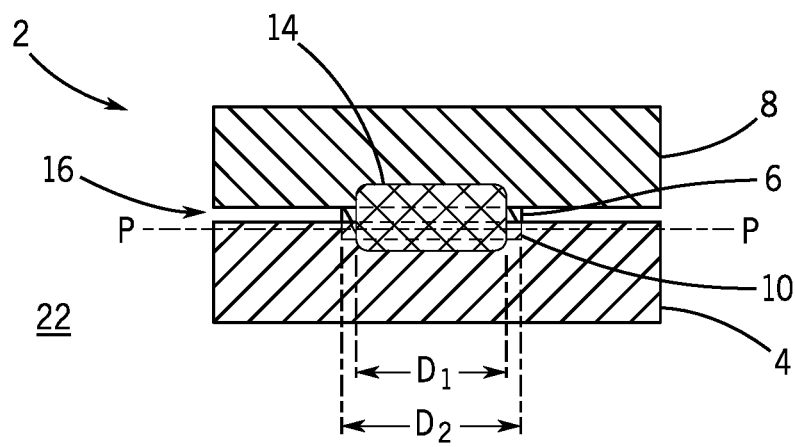
FIG. 3 is a schematic cross-section view of a welded assembly in accordance with the present subject matter.

As depicted in FIGS. 3 and 5, the first component 4 does not contact the third component 8, and these are is instead separated by a gap 16 existing between the first component 4 and the third component 8. This gap 16 may be provided by the second component 6 arranged between the first component 4 and the third component 8. The separation between the first component 4 and the third component 8, as provided by the gap 16 and by the second component 6 in the welded region (i.e. the region including the ultrasonic weld 10 and the resistance spot weld 14), inhibits galvanic reactions that may occur between the first component 4 and the third component 8 when exposed to an electrolyte. When the first and third components 4, 8 are made of compositionally dissimilar materials (e.g. aluminum and steel), this isolation of and increased distance between the first component 4 from the third components 8 using the second component 6 inhibits corrosion (e.g. galvanic corrosion between aluminum and steel) that could otherwise result if there was contact between the dissimilar metals.

Having such a gap 16 is not necessary to the invention, and instead the first component 4 and third component 8 can be separated from each other by other layers or materials, such as a layer of sealant 32 or a layer of adhesive 34 as described herein.

A layer of sealant 32 may be arranged over the stack 12 prior to resistance spot welding, such that it is arranged at an interface between the stack 12 and the third component 8. The sealant 32 may be applied to prevent water (i.e. electrolyte) from penetrating into the welded region; to prevent water from contacting the resistance spot weld 14; to prevent water from simultaneously contacting, and thus creating a galvanic connection between the first component 4 and the third component 8; and/or to prevent the first component 4 from contacting the third component 8.

The sealant 32 may include an e-coating layer applied by subjecting the stack 12 to an e-coating process. The e-coating process—also known as electrophoretic painting, electrocoating, electropainting etc.—may include dispersing coating materials (resins, pigments, additives, etc.) in a bath of water. The stack 12 may be immersed in the bath, and an electrical current is passed through the bath. The stack 12 acts as an electrode, which causes the coating materials in the bath to come out of solution and adhere to the stack 12. The coating material may be cured by baking in an oven to make it hard and durable and thus form the sealant 32. Other materials and application processes may be used as the sealant 32.

Additionally or alternatively, a layer of adhesive 34 may be applied over the stack 12 prior to resistance spot welding, such that it is arranged at an interface between the stack 12 and the third component 8. The adhesive 34 may be used to secure the third component 8 in place relative to the stack 12 before and during resistance spot welding; to contribute to the bond strength between the first component 4 and the third component 8; and/or to prevent the first component 4 from contacting the third component 8. The adhesive 34 may also operate as a sealant to electrolyte, or may contribute to the sealing effect provided by the sealant 32. Various structural adhesives may be used as the adhesive 34.

Figure 8:
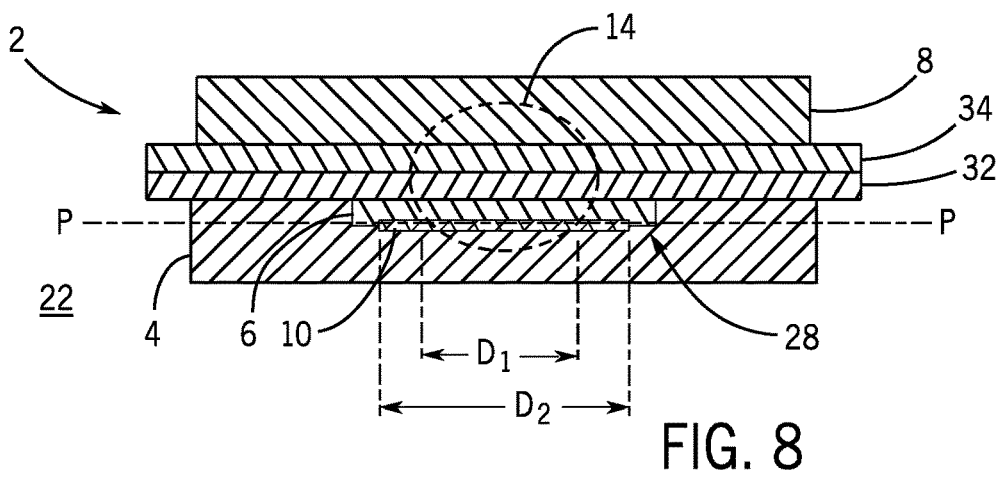
FIG. 8 is a schematic cross-section view of a welded assembly in accordance with the present subject matter.

The sealant 32 and/or adhesive 34 may occupy the area between the first component 4 and the third component 8, such that there may not be a gap 16 between them (FIG. 8). Nevertheless, the sealant 32 and/or adhesive 34 may prevent contact between the first component 4 and the third component 8, thus inhibiting a galvanic reaction between them.

After USW or UAM welding the second component 6 to the first component 4 to form the stack 12, the first and third components 4, 8 are then arranged so that the second component 6 is sandwiched between them. The first and third components 4, 8 can then be welded together by resistance spot welding using resistance spot welding tips 40.

The resistance spot weld 14 may be considered the primary weld for bonding the various elements of the welded assembly 2, while the ultrasonic weld 10 may be considered a secondary weld in the welded assembly 2. That is, the resistance spot weld 14 may provide the majority of strength to the bond between the various elements of the welded assembly 2, while the ultrasonic weld 10 may provide only a minority of the strength to the bond.

Resistance spot welding is used to join the third component 8 to the stack 12 because resistance spot welding is capable of forming the resistance spot weld 14 even in the presence of the sealant 32 and adhesive 34. That is, the resistance spot weld 14 extends through the sealant 32, the adhesive 34, and/or other coatings 26 on the steel material 24 of the third component 8. Solid state welding processes, in contrast, require these layers to be removed.

The resistance spot weld 14 may include an aluminum material weld nugget 36 in the aluminum material of the first component 4, and a steel weld nugget 38 in the steel material of the third component 8 (See FIG. 5), both of which are separated from each other by a stainless steel weld nugget 42 of the second component 6.

The resistance spot weld 14 consumes (i.e. contacts) a portion the first component 4, a portion of the second component 6, and a portion of the third component 8. As depicted, the resistance spot weld 14 extends longitudinally through the entire thickness of the second component 6, but does extend past the lateral perimeter of the second component 6. The resistance spot weld 14 also extends longitudinally through the ultrasonic weld 10, but again does not extend past the lateral perimeter of the ultrasonic weld 10. As such, the resistance spot weld 14 is completely encapsulated by the various other components of the welded assembly 2, and thus is not directly exposed to the surrounding environment 22 and any electrolyte therein. This inhibits the electrolyte in the surrounding environment 22 from contacting the resistance spot weld 14, and thus inhibits corrosion of the resistance spot weld 14 or the area around the resistance spot weld 14.

As indicated, the resistance spot weld 14 may be formed at a remote time and location from the formation of the ultrasonic weld 10. For example, a parts supplier may form the ultrasonic weld 10 between the first component 4 and the second component 6 at the supplier's production facility, and then ship the stack 12 to a car manufacturer's production facility, which is remote in location from the supplier's production facility. The stack 12 can be joined by resistance spot welding the third component 8 to the stack 12 at the car manufacturer's production facility at a time remote from the formation of the ultrasonic weld 10. This arrangement allows for the production of the welded assembly 2 without requiring the car manufacturer's facility to be modified or upgraded to allow for USW or UAM welding. The USW or UAM welding being performed off-site at the supplier's production facility, allows the car manufacturer to save time and money that would otherwise be necessary to upgrade the production facility to allow for UAM welding.

The present subject matter includes a method of making a welded assembly 2 by ultrasonic welding the second component 6, comprising stainless steel, to the first component 4, comprising an aluminum material to form the stack 12. The method then includes resistance spot welding the third component 8, comprising a steel material, to the stack 12. The second component 6 is arranged between the first component 4 and the third component 8 during resistance spot welding, and the resistance spot weld 14 formed during resistance spot welding encompasses at least a portion of the ultrasonic weld 10 formed during ultrasonic welding.

The resistance spot weld 14 may be sealed from coming into contact with an electrolyte from the surrounding environment 22. This may be accomplished by arranging a layer of sealant 32 and/or adhesive 34 on the stack 12 so as to cover the surface 44 of the second component 6 and the surface 46 of the first component 4.

The sealant 32 may be applied by e-coating the stack 12 before resistance spot welding so as to form an e-coating layer on the stack 12. The sealant 32 (e.g. e-coating) is arranged between the third component 8 and the stack 12 so as to separate the third component 8 from the first component 4 and from the second component 6.

The method may also include arranging a layer of adhesive 34 on the stack 12 before resistance spot welding. The adhesive 34 may be arranged directly on the stack 12, or on the sealant 32 (e.g. e-coating layer) such that the sealant 32 is arranged between the adhesive 34 and the stack 12, and so that the adhesive 34 is arranged between the third component 8 and the first and second components 4, 6.

When the stack 12 is welded with the third component 8 to form the welded assembly 2, the sealant 32 and/or the adhesive 34 is arranged between the stack 12 and the third component 8. When both the sealant 32 and adhesive 34 are included, the adhesive 234 is arranged between the sealant 32 and the third component 8.

The resistance spot weld 14 encompasses at least a portion of each of the first component 4, the second component 6, and the third component 8, and also encompasses a portion of the ultrasonic weld 10. This is shown schematically in FIG. 3, where the resistance spot weld 14 is shown to overlie portions of the first, second, and third components, and a portion of the ultrasonic weld 10. This is shown in more detail in FIG. 5, where the resistance spot weld 14 includes an aluminum material weld nugget 36 encompassing a portion of the first component 4, a stainless steel weld nugget 42 encompassing a portion of the second component 6, and a steel weld nugget 38 encompassing a portion of the third component 8. As shown in both FIGS. 3 and 5, the diameter $D_1$ of the resistance spot weld 14 is smaller than the diameter $D_2$ of the ultrasonic weld 10. This allows the resistance spot weld 14 to be isolated from electrolyte in the surrounding environment 22.

The method may further include arranging the second component 6 in a depression 30 in the first component 4 before ultrasonic welding. The depression 30 and second component 6 may have corresponding sizes so that the second component 6 may be arranged snuggly in the depression 30 before ultrasonic welding. The depression 30 may thus hold the second component 6 in place relative to the first component 4 before and during ultrasonic welding, and may further protect the interface between the first and second components from coming into contact with the electrolyte in the surrounding environment 22. Further, the stack 12 may then present a flat surface (i.e. combined flush surfaces 44 and 46 in FIGS. 7-8), as opposed to a non-flat surface (i.e. combined non-flush surfaces 44 and 46 in FIG. 6), upon which the sealant 32 and/or adhesive 34 is applied, and upon with the third component 8 is arranged for resistance spot welding.

The welded assembly 2 formed by the described methods may be used as a vehicle component, vehicle frame, or portions thereof, for example as a frame member, panel member, or other component of a vehicle. The welded assembly 2 can be used to form other types of component. Because the second component 6 can be ultrasonically welded to the first component 4 at a time and location remote from the first and third components 4, 8 being resistance spot welded together, it is possible for the welded assembly 2 to be produced through known vehicle assembly lines without any requirement for re-tooling or additional capital investment to provide UAM capabilities. The welded assembly 2 can be mounted as part of a vehicle, and optionally e-coated and subjected to painting processes, including curing or baking paint that has been applied to the welded assembly 2.

Further, the welded assembly 2 can include more than one ultrasonic weld 10 and more than one resistance spot weld 14, for example, two or more of these. It will also be appreciated that the welds 10, 14 can comprise different shapes and/or sizes than shown in the figures. Further, the arrangement of the first, second, and third components 4, 6, 8 are depicted in the figures to form a lap joint However, the present subject matter is not limited to this arrangement, and includes other arrangements so as to form, for example, butt joints, T-joints, flange joints, etc. Additionally, other components can be welded to the welded assembly 2 using an additional welding process.

The present subject matter allows for the joining of dissimilar metals using conventional resistance spot welding techniques such that the resistance spot weld 14 contacts all of the first, second, and second components 4, 6, 8, and the ultrasonic weld 10, all while avoiding the formation of detrimental IMCs, galvanic corrosion, and/or solidification cracking in the welded assembly 2, thereby producing strong and durable welded joints between dissimilar materials.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A welded assembly comprising:
    a first component comprising an aluminum material;
    a second component comprising stainless steel, and welded to the first component by an ultrasonic weld;
    a third component comprising a steel material, and welded to the first component with a resistance spot weld, the resistance spot weld encompassing at least a portion of the ultrasonic weld;
    wherein the second component is arranged between the first component and the third component,
    wherein the welded assembly further includes an e-coating layer separating the third component from the first and second components, and
    wherein the resistance spot weld passes through the e-coating layer.

2. The welded assembly according to claim 1, wherein the resistance spot weld is sealed from coming into contact with an electrolyte from a surrounding environment.

3. The welded assembly according to claim 1, further including an adhesive layer separating the third component from the first and second components, wherein the resistance spot weld passes through the adhesive layer.

4. The welded assembly according to claim 1, wherein the resistance spot weld encompasses at least a portion of each of the first component, the second component, and the third component.

5. The welded assembly according to claim 1, wherein in a plane parallel to an interface between the first component and the second component, an area of the ultrasonic weld completely encompasses an area of the resistance spot weld.

6. A welded assembly comprising:
   a first component comprising an aluminum material;
   a second component comprising stainless steel, and welded to the first component by an ultrasonic weld; and
   a third component comprising a steel material, and welded to the first component with a resistance spot weld, the resistance spot weld encompassing at least a portion of the ultrasonic weld;
   wherein the second component is arranged between the first component and the third component, and
   wherein the second component is arranged in a depression in the first component.

7. The welded assembly according to claim 1, wherein the aluminum material is an aluminum alloy.

8. The welded assembly according to claim 1, wherein the stainless steel is a grade 316 stainless steel.

9. The welded assembly according to claim 1, wherein the steel material is a galvannealed steel.

10. A method of forming a welded assembly, comprising:
    ultrasonic welding a second component comprising stainless steel to a first component comprising an aluminum material to form a stack; and
    resistance spot welding a third component comprising a steel material to the stack;
    wherein the second component is arranged between the first component and the third component during resistance spot welding;
    wherein a resistance spot weld formed during the resistance spot welding encompasses at least a portion of an ultrasonic weld formed during the ultrasonic welding;
    wherein the method further comprises e-coating the stack before resistance spot welding so as to form an e-coating layer on the stack; and
    wherein the e-coating layer is arranged between the third component and the stack.

11. The method according to claim 10, wherein the resistance spot weld is sealed from coming into contact with an electrolyte from a surrounding environment.

12. The method according to claim 10, further including arranging an adhesive layer on the stack before resistance spot welding,
    wherein the adhesive layer is arranged between the e-coating layer and the third component.

13. The method according to claim 12, wherein the resistance spot weld encompasses at least a portion of each of the first component, the second component, and the third component.

14. The method according to claim 10, wherein in a plane parallel to an interface between the first component and the second component, an area of the ultrasonic weld completely encompasses an area of the resistance spot weld.

15. A method of forming a welded assembly comprising:
    ultrasonic welding a second component comprising stainless steel to a first component comprising an aluminum material to form a stack; and
    resistance spot welding a third component comprising a steel material to the stack;
    wherein the second component is arranged between the first component and the third component during resistance spot welding;
    wherein a resistance spot weld formed during the resistance spot welding encompasses at least a portion of an ultrasonic weld formed during the ultrasonic welding;
    wherein the method further includes arranging the second component in a depression in the first component before ultrasonic welding.

16. The method according to claim 10, wherein the aluminum material is an aluminum alloy.

17. The method according to claim 10, wherein the stainless steel is a grade 316 stainless steel.

18. The method according to claim 10, wherein the steel material is a galvannealed steel.

* * * * *